US009995163B2

(12) United States Patent
Chuong et al.

(10) Patent No.: US 9,995,163 B2
(45) Date of Patent: Jun. 12, 2018

(54) HALO SEAL ATTACHED SECONDARY SEAL COVER ARRANGEMENT (71) Applicant: United Technologies Corporation, Farmington, CT (US)

(72) Inventors: Conway Chuong, Manchester, CT (US); Ross Wilson, South Glastonbury, CT (US); Joey Wong, Enfield, CT (US); Christpher J. Peters, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days. days.

(21) Appl. No.: 15/256,134

(22) Filed: Sep. 2, 2016

(65) Prior Publication Data
US 2018/0066533 A1 Mar. 8, 2018

(51) Int. Cl.
F16J 15/447 (2006.01)
F01D 11/04 (2006.01)
F04D 29/08 (2006.01)

(52) U.S. Cl.
CPC .......... F01D 11/04 (2013.01); F04D 29/083 (2013.01); F05D 2220/32 (2013.01); F05D 2230/237 (2013.01); F05D 2230/238 (2013.01)

(58) Field of Classification Search
CPC ........ F01D 11/04; F01D 25/162; F01D 25/24; F16J 15/3268; F16J 15/40
See application file for complete search history.

(56) References Cited

U.S. PATENT DOCUMENTS

| 5,031,922 | A | * | 7/1991 | Heydrich | ............... | F01D 11/02 277/355 |
| 5,042,823 | A | * | 8/1991 | Mackay | .................. | F01D 11/02 277/355 |
| 5,066,024 | A | * | 11/1991 | Reisinger | ................ | A46D 3/05 277/355 |
| 5,071,138 | A | * | 12/1991 | Mackay | .................. | F01D 11/02 277/303 |
| 6,105,967 | A | | 8/2000 | Turnquist et al. | | |

(Continued)

FOREIGN PATENT DOCUMENTS

EP 1018613 7/2000
EP 1018613 A2 7/2000

(Continued)

OTHER PUBLICATIONS

Extended European Search Report dated Dec. 18, 2017 in European Application No. 17179191.6.

(Continued)

Primary Examiner — Gilbert Y Lee
(74) Attorney, Agent, or Firm — Snell & Wilmer L.L.P.

(57) ABSTRACT

A seal sub-assembly may comprise a spacer, at least one secondary seal, and a secondary seal cover. At least a portion of the at least one secondary seal are located axially between the spacer and the secondary seal cover. The spacer is attached to the secondary seal cover. The spacer may comprise a first flange and a second flange. The at least one secondary seal may be located axially in line with and radially inward from the first flange. At least a portion of the secondary seal cover may be located axially in line with and radially inward from the second flange.

17 Claims, 7 Drawing Sheets (56) References Cited

U.S. PATENT DOCUMENTS

| | | | | |
|---|---|---|---|---|
| 6,145,844 | A | * 11/2000 | Waggott | F01D 11/025 |
| | | | | 277/412 |
| 2001/0004145 | A1 | * 6/2001 | Wright | F16J 15/3288 |
| | | | | 277/355 |
| 2002/0020968 | A1 | * 2/2002 | Gail | F16J 15/3288 |
| | | | | 277/355 |
| 2003/0178778 | A1 | * 9/2003 | Szymbor | F16J 15/3288 |
| | | | | 277/355 |
| 2006/0091611 | A1 | * 5/2006 | Addis | F16J 15/3288 |
| | | | | 277/355 |
| 2013/0234397 | A1 | 9/2013 | Uehara | |

FOREIGN PATENT DOCUMENTS

| | | |
|---|---|---|
| EP | 2878864 | 6/2015 |
| EP | 2878864 A1 | 6/2015 |

OTHER PUBLICATIONS

EP Search report dated Dec. 18, 2017 in EP Application No. 17179191.6.

\* cited by examiner

HALO SEAL ATTACHED SECONDARY SEAL COVER ARRANGEMENT

GOVERNMENT LICENSE RIGHTS

This disclosure was made with government support under FA 8650-09-D-2923 0021 awarded by the United States Air Force. The government has certain rights in the disclosure.

FIELD

This disclosure relates generally to gas turbine engines, and more particularly to seal assemblies for turbine engine shafts.

BACKGROUND

Gas turbine engines are known, and typically include a fan delivering air into a compressor, and also outwardly of the compressor as bypass air. The air is compressed in the compressor and delivered downstream into a combustion section where it is mixed with fuel and ignited. Products of this combustion pass downstream over turbine rotors, driving the turbine rotors to rotate. The turbine rotors in turn rotate the compressors and fan.

The fan and compressor are typically driven by the turbine rotors via shafts. Seals may be provided around the shafts.

SUMMARY

A seal sub-assembly may comprise a spacer, at least one secondary seal, and a secondary seal cover, wherein at least a portion of the at least one secondary seal are located axially between the spacer and the secondary seal cover, and wherein the spacer is attached to the secondary seal cover via a metal joining process.

In various embodiments, the spacer may comprise a first flange comprising a first proximal surface and may comprise a second flange comprising a second proximal surface. The at least one secondary seal may be located radially inward from and axially in line with the first proximal surface. The secondary seal cover may be located radially inward from and axially in line with the second proximal surface. The spacer, the at least one secondary seal, and the secondary seal cover may comprise an annular geometry. The spacer may be configured to be located axially adjacent to a non-contact seal.

A method for manufacturing a seal sub-assembly may comprise placing at least one secondary seal axially adjacent to a spacer, placing a secondary seal cover axially adjacent to the at least one secondary seal and in contact with the spacer, wherein the at least one secondary seal is located axially between the spacer and the secondary seal cover, and attaching the secondary seal cover to the spacer.

In various embodiments, the placing of the at least one secondary seal axially adjacent to the spacer may provide a distal surface of the at least one secondary seal axially in line with a proximal surface of a first flange of the spacer. The attaching of the secondary seal cover may be performed via a metal joining process. The attaching may be performed at a junction between a distal surface of the secondary seal cover and a proximal surface of the spacer. The placing of the secondary seal cover axially adjacent to the at least one secondary seal may include placing the secondary seal cover radially inward from a second flange of the spacer.

A method for assembling a seal arrangement may comprise placing a seal sub-assembly into an annular carrier, placing a seal axially adjacent to the seal sub-assembly, and placing a seal plate axially adjacent to the seal, the seal located axially between the seal sub-assembly and the seal plate and the annular carrier circumferentially surrounding at least one of the seal sub-assembly, the seal, and the seal plate.

In various embodiments, the method may further comprise placing the annular carrier into an annular static structure, a distal surface of the annular carrier in contact with a proximal surface of the annular static structure. The method may further comprise positioning the annular carrier such that the seal sub-assembly contacts a flange extending radially inwards from the annular static structure. The seal sub-assembly may comprise a secondary seal cover attached to a spacer via a metal joining process, which may comprise at least one of a weld, a solder or a braze. The positioning the annular carrier such that the seal sub-assembly contacts the flange may comprise placing the at least one of the weld, the solder, or the braze between the flange and the seal sub-assembly. The seal sub-assembly may further comprise at least one secondary seal located between the secondary seal cover and the spacer. The seal may comprise a non-contact seal. The placing the annular carrier into the annular static structure may comprise snapping the annular carrier into the annular static structure. A maximum diameter of the secondary seal cover may be less than a minimum diameter of the annular carrier.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "distal" refers to the direction radially outward, or generally, away from the axis of rotation of a turbine engine. As used herein, "proximal" refers to a direction radially inward, or generally, towards the axis of rotation of a turbine engine.

As used herein, "snap" refers to the process of placement of a first cylindrical component into a second cylindrical component, such that the second cylindrical component circumferentially surrounds the first component, wherein the outer diameter (OD) of the first component is greater than the inner diameter (ID) of the second component. In various embodiments, the first component may be pressed into the second component. In various embodiments, the OD of the first component may be decreased by decreasing the temperature of the first component before placing the first component into the second component. In various embodiments, the ID of the second component may be increased by increasing the temperature of the second component before placing the first component into the second component.

Typically, a seal assembly may comprise a secondary seal cover configured to be snapped or threaded into a carrier. The thickness (as measured in the axial direction) of the secondary seal cover is generally sufficient to provide a surface onto which threads may be machined or to provide enough surface and structural integrity for the secondary seal cover to be snapped into the carrier.

Seal arrangements, as provided herein, comprise a secondary seal cover configured to be attached to a spacer. The secondary seal cover may be attached to a spacer via a metal joining process such as via a weld, solder, or braze, for example. The spacer comprises a second flange which circumferentially surrounds at least a portion of the secondary seal cover. In this regard, the thickness of the secondary seal cover may be reduced as a result of the secondary seal cover not having threads or not needing sufficient surface area and structural integrity to be snapped into the carrier. Further, attaching the secondary seal cover to the spacer provides a seal sub-assembly with at least one secondary seals located between the secondary seal cover and the spacer, as described in more detail herein. In this regard, handling of the relatively thin secondary seal(s) is facilitated by providing the sub-assembly. In this regard, the seal sub-assembly, as provided herein, may allow for ease of handling and installation of the sub-assembly and related components as well as provide weight savings as a result of the reduction in size of the secondary seal cover.

Figure 1:
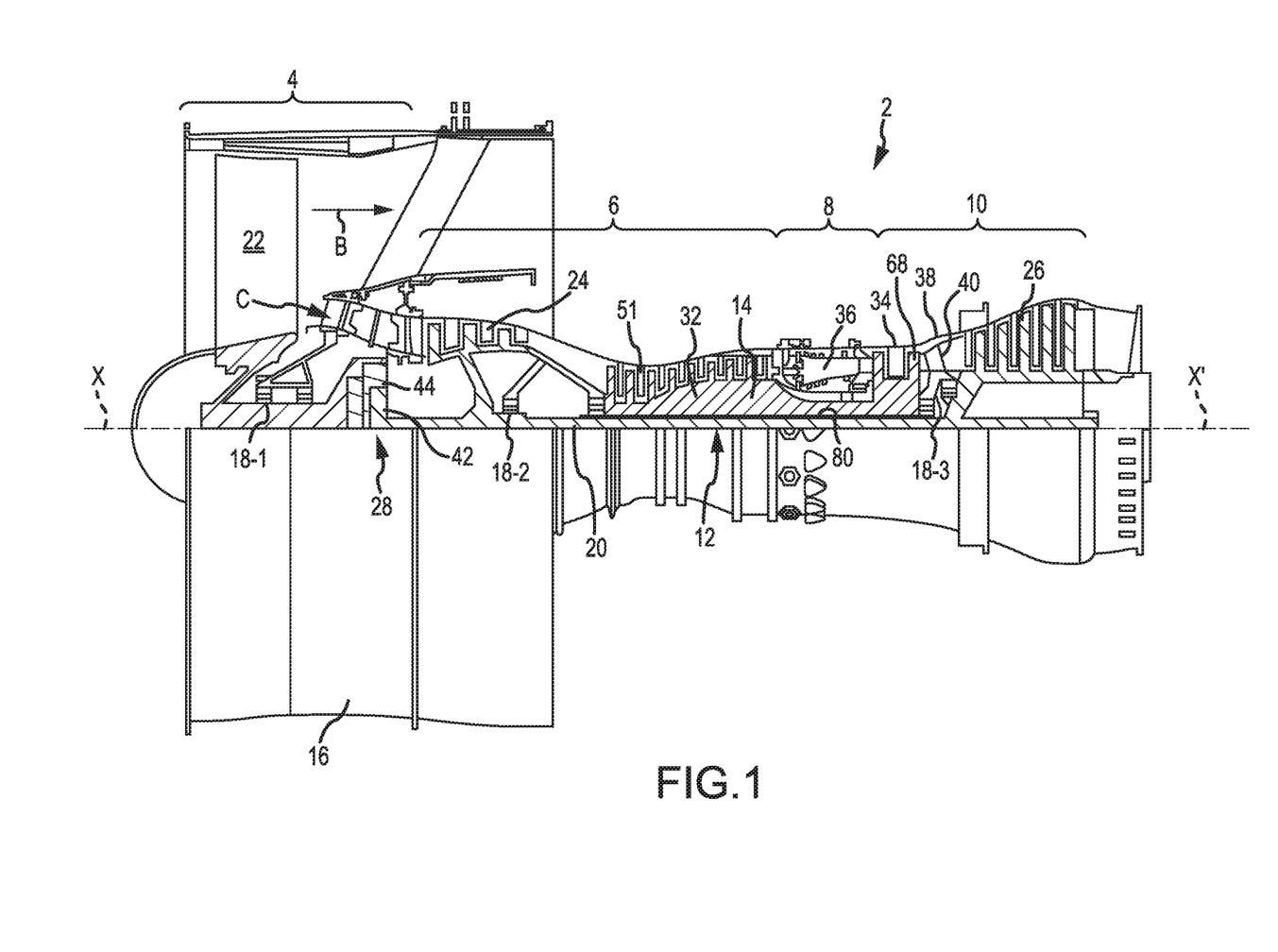
FIG. 1 illustrates a side cutaway view of a turbine engine, in accordance with various embodiments.

With reference to FIG. 1, an exemplary gas turbine engine 2 is provided, in accordance with various embodiments. Gas turbine engine 2 is a two-spool turbofan that generally incorporates a fan section 4, a compressor section 6, a combustor section 8 and a turbine section 10. Vanes 51 may be disposed throughout the gas turbine engine 2. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

An engine 2 may comprise a rotor blade 68 or a stator vane 51. Stator vanes 51 may be arranged circumferentially about the engine central longitudinal axis X-X'. Stator vanes 51 may be variable, meaning the angle of attack of the airfoil of the stator vane may be variable relative to the airflow proximate to the stator vanes 51. The angle of attack of the variable stator vane 51 may be variable during operation, or may be fixable for operation, for instance, being variable during maintenance or construction and fixable for operation. In various embodiments, it may be desirable to affix a variable vane 51 in fixed position (e.g., constant angle of attack).

Figure 4:
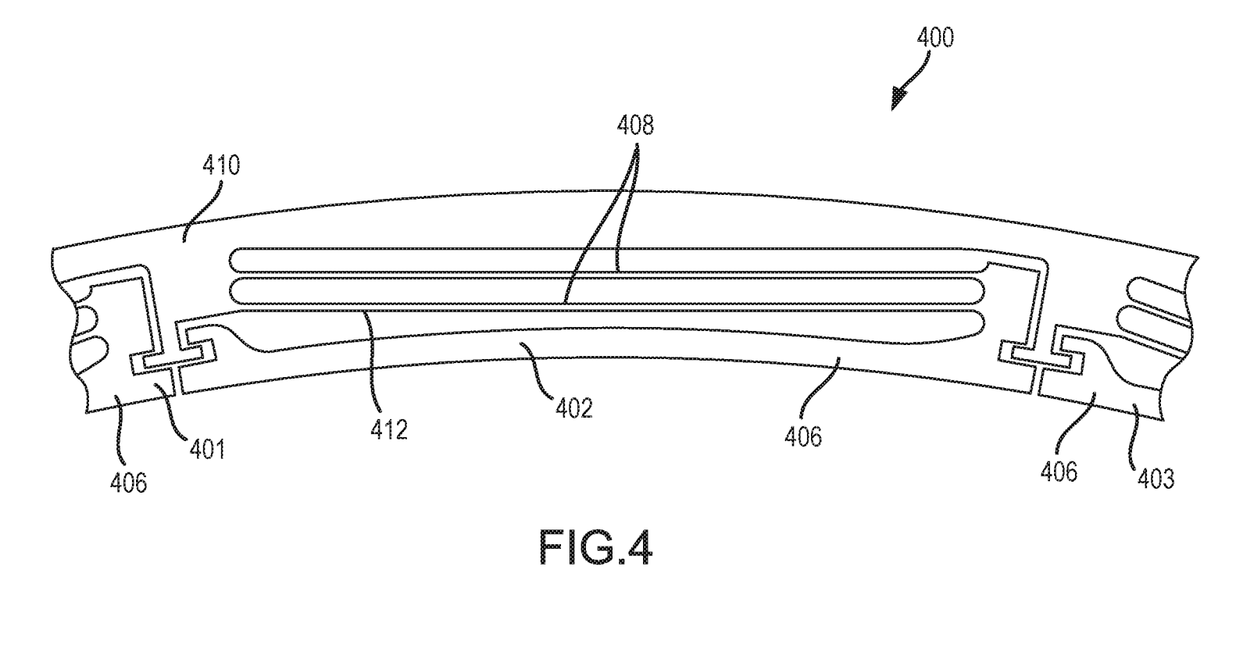
FIG. 4 illustrates an exemplary non-contact seal, in accordance with various embodiments.

A non-contact seal may be associated with the turbine section, the compressor section, or the fan section as illustrated in FIG. 1. FIG. 4 shows one example of a non-contact seal. One type of non-contact seal may be a hydrostatic advanced low leakage seal, for example, a HALO™ seal available from ATGI, Advanced Technologies Group, Inc. of Stuart, Fla. The HALO™ seal 400 as shown has inner shoes 406 and an outer carrier 410. The outer carrier 410 and the shoes 406 are generally formed from a single piece of metal, and may be cut as shown at 412 such that the combined seal 400 is formed into segments. As shown in FIG. 4, there are portions of three adjacent segments 401, 402, 403, which come together to form the overall seal 400. Shoes 406 may be coupled to outer carrier 410 via arms 408. As shown, the cuts 412 may provide a gap that allows arms 408 to provide a spring force.

Figure 2:
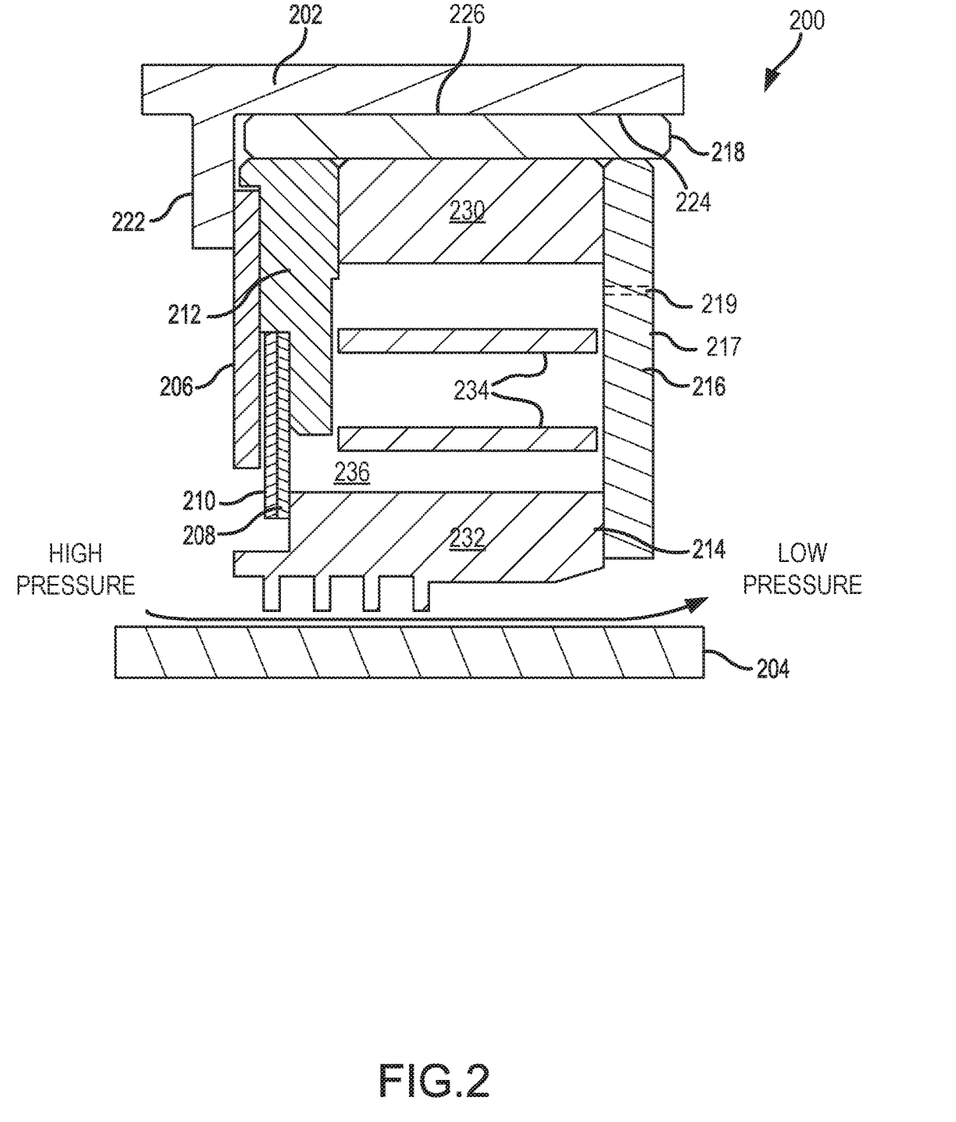
FIG. 2 illustrates a cross-section view of a seal arrangement installed within a static structure and over a shaft, in accordance with various embodiments.

With reference to FIG. 2, a cross-section view of seal arrangement 200 in the installed position is illustrated, in accordance with various embodiments. Seal arrangement 200 may include seal 214, spacer 212, at least one secondary seal (i.e., first secondary seal 208 and/or second secondary seal 210), secondary seal cover 206, seal plate 216, and carrier 218. In various embodiments, static structure 202 may circumferentially surround seal arrangement 200. In various embodiments, seal arrangement 200 may be snapped into static structure 202. In various embodiments, seal arrangement 200 may be threaded into static structure 202. In various embodiments, spacer 212 may be snapped into carrier 218. In various embodiments, seal 214 may be snapped into carrier 218. In various embodiments, seal plate 216 may be snapped into carrier 218. Seal arrangement 200 may circumferentially surround shaft 204. In various embodiments, seal 214 may comprise a non-contact seal. In this regard, seal 214 may be configured to not physically contact shaft 204.

With combined reference to FIG. 1 and FIG. 2, shaft 204 may be mounted for rotation about engine central longitudinal axis X-X'. In various embodiments, shaft 204 may comprise low speed spool 12. In various embodiments, shaft 204 may comprise high speed spool 14.

With reference to FIG. 2, fluid such as air, for example, may travel from the high pressure side of seal arrangement 200 to the low pressure side of seal arrangement 200. First secondary seal 208 and second secondary seal 210 may prevent fluid from high pressure side of seal arrangement 200 from entering gap 236 of seal 214. In various embodiments, seal plate 216 may comprise a scalloped plate 217. Seal plate 216 may comprise a plurality of apertures 219 which allow fluid from low pressure side of seal arrangement 200 into gap 236 of seal 214. As described in further detail in FIG. 4, seal 214 may comprise a shoe 232 attached to outer carrier 230 via arms 234. In this regard, it should be appreciated that the pressure gradient across seal 214 may act to move shoe 232 in the radial direction with respect to outer carrier 230. Said movement may aid in preventing shoe 232 from contacting shaft 204.

Figure 5:
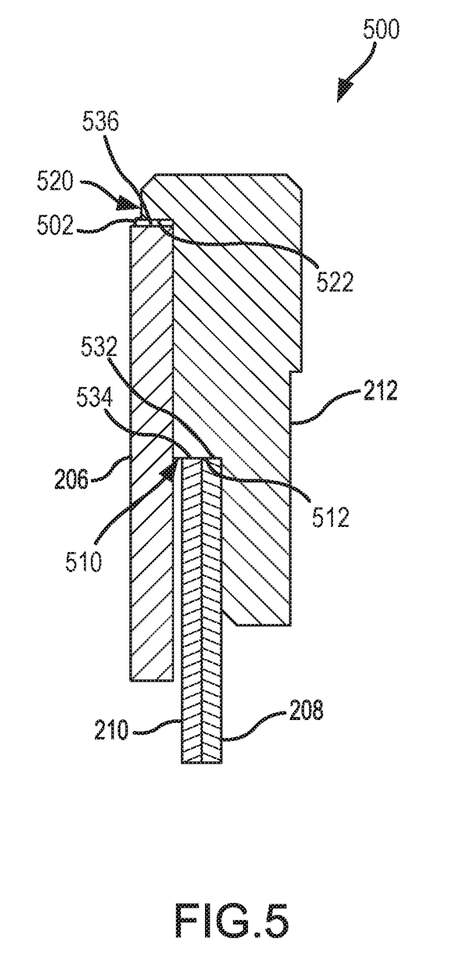
FIG. 5 illustrates a cross-section view of a seal sub-assembly, in accordance with various embodiments.

With reference to FIG. 5, spacer 212, first secondary seal 208, second secondary seal 210, and secondary seal cover 206 may be assembled as a seal sub-assembly 500, in accordance with various embodiments. Spacer 212 may comprise a first flange 510 and a second flange 520. First flange 510 may comprise a proximal surface 512. Second flange 520 may comprise a proximal surface 522. First secondary seal 208 may comprise a distal surface (also referred to herein as a first distal surface) 532. Second secondary seal 210 may comprise a distal surface (also referred to herein as a second distal surface) 534. Distal surface 532 and distal surface 534 may be located radially inward and axially in line with proximal surface 512. Secondary seal cover 206 may comprise distal surface 536. Distal surface 536 may be located radially inward from and axially in line with proximal surface 522. Secondary seal cover 206 may be attached to spacer 212 via weld 502. In various embodiments, weld 502 may be placed at the junction between second flange 520 and distal surface 536. In various embodiments, weld 502 may comprise a spot weld. In various embodiments, a plurality of spot welds may be circumferentially spaced around seal sub-assembly 500. For example, three spot welds may be circumferentially spaced around seal sub-assembly 500 at the junction between second flange 520 and secondary seal cover 206. In various embodiments, weld 502 may comprise a continuous weld along the entire circumference of the junction between spacer 212 and secondary seal cover 206. Although having described attaching spacer 212 to secondary seal cover 206 via a weld, it is also contemplated herein that spacer 212 may be attached to secondary seal cover 206 via a braze or a solder. In this regard, first secondary seal 208 and second secondary seal 210 may be held in place between secondary seal cover 206 and spacer 212 during handling and installation.

Figure 3:
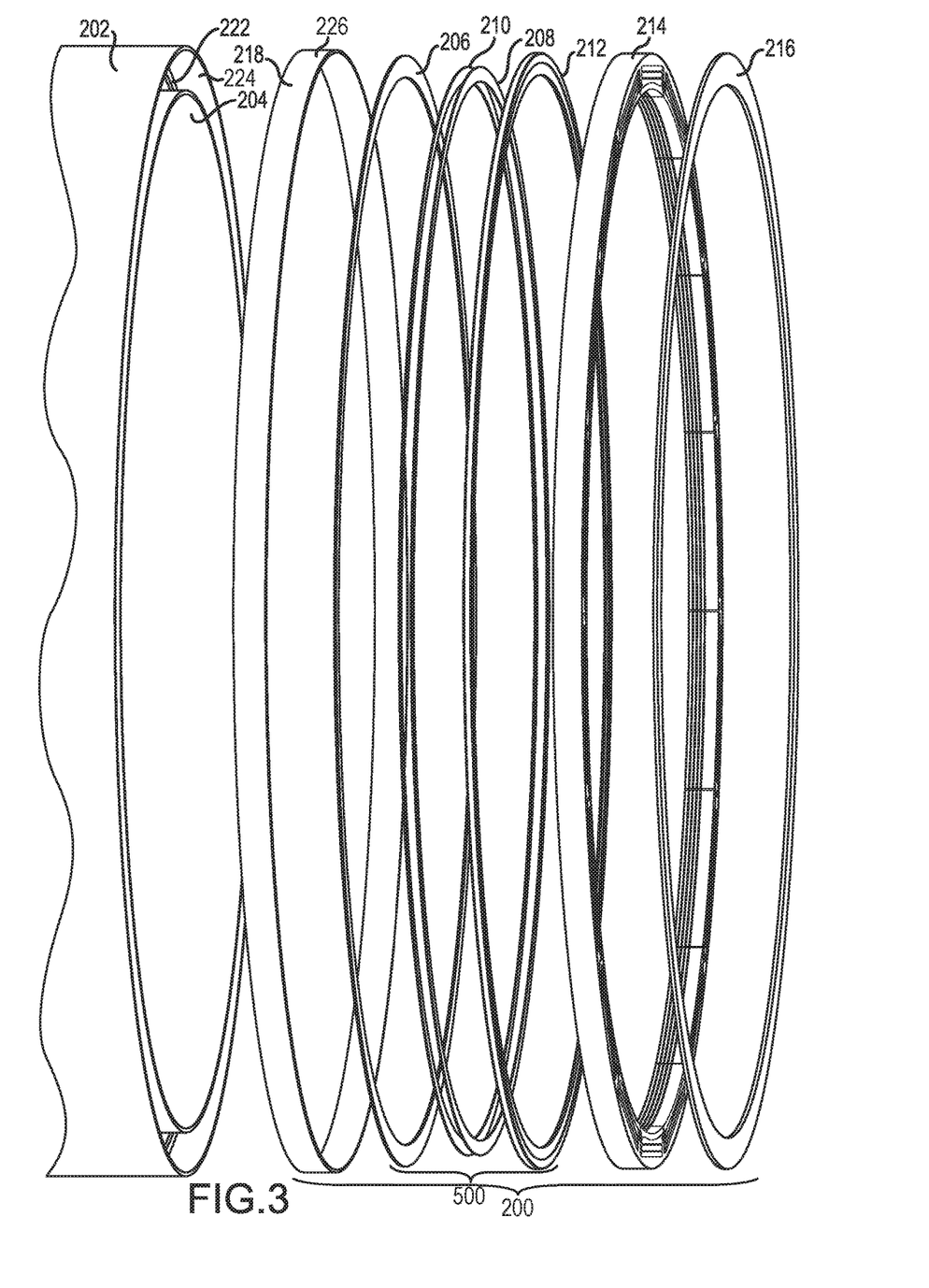
FIG. 3 illustrates an exploded perspective view of the seal arrangement of FIG. 2, in accordance with various embodiments.

With combined reference to FIG. 2 and FIG. 3, carrier 218 may comprise a distal surface 226. Static structure 202 may comprise a proximal surface 224 from which flange 222 extends. Flange 222 may extend radially inwards. In various embodiments, flange 222 may circumferentially span the inner diameter of proximal surface 224. In various embodiments, flange 222 may circumferentially span only a portion of the inner diameter of proximal surface 224. In this regard, a plurality of flanges 222 may be circumferentially spaced along proximal surface 224. In various embodiments, at least three flanges 222 may be circumferentially spaced along proximal surface 224. In various embodiments, carrier 218 may be snapped into static structure 202.

As illustrated in FIG. 3, seal 214, spacer 212, first secondary seal 208, second secondary seal 210, secondary seal cover 206, seal plate 216, and carrier 218 may comprise an annular geometry.

Figure 6:
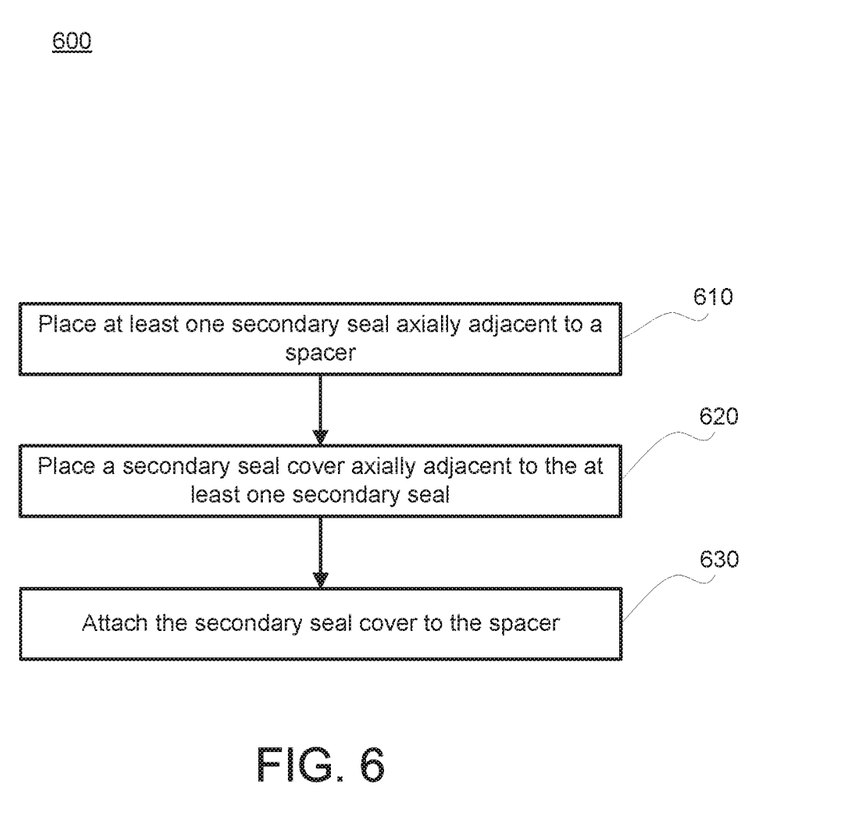
FIG. 6 illustrates a method for manufacturing a seal sub-assembly, in accordance with various embodiments.

With reference to FIG. 6, a method 600 for manufacturing a seal sub-assembly is provided, in accordance with various embodiments. Method 600 includes placing at least one secondary seal axially adjacent to a spacer (step 610). Method 600 includes placing a secondary seal cover axially adjacent to the secondary seal (step 620). Method 600 includes attaching the secondary seal cover to the spacer (step 630).

With combined reference to FIG. 5 and FIG. 6, step 610 may include placing first secondary seal 208 axially adjacent to spacer 212. Step 610 may include placing second secondary seal 210 axially adjacent to first secondary seal 208.

Although illustrated as having two secondary seals (i.e., first secondary seal 208 and second secondary seal 210), it is contemplated herein that any number of secondary seals may be disposed axially between secondary seal cover 206 and spacer 212, such as one, two, three, or more secondary seals. Step 620 may include placing secondary seal cover 206 axially adjacent to second secondary seal 210. Step 630 may include attaching secondary seal cover 206 to spacer 212. Step 630 may include attaching secondary seal cover 206 to spacer 212 via a metal joining process such as via a weld, solder, or braze, for example.

Figure 7:
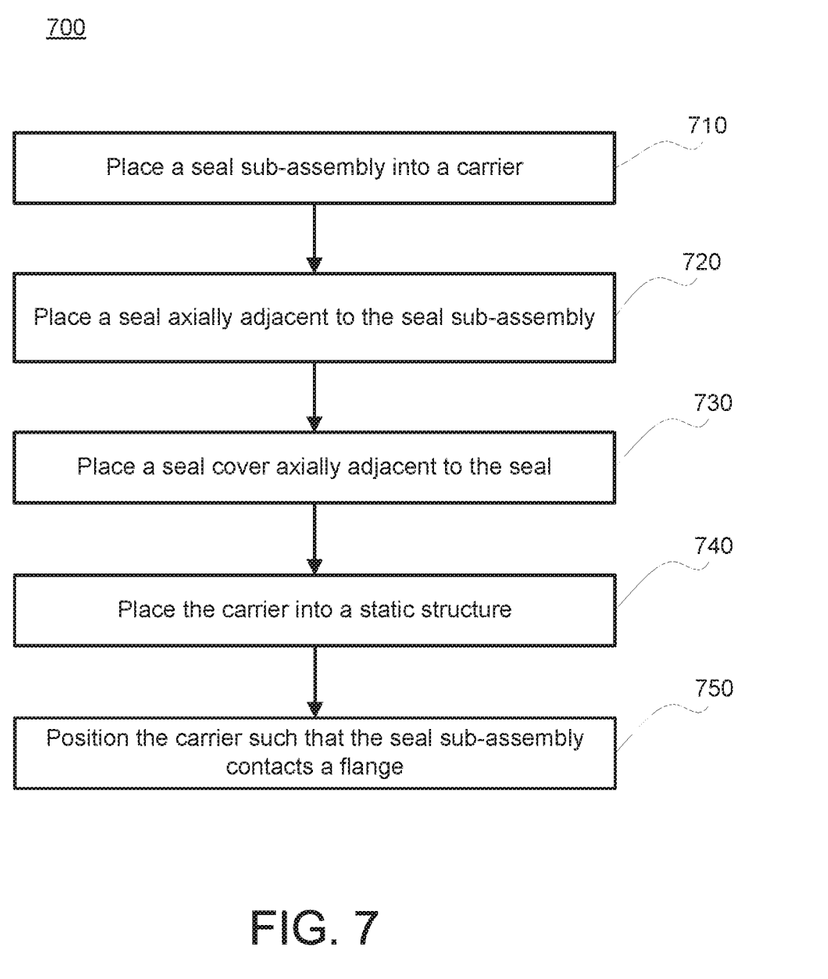
FIG. 7 illustrates a method for assembling a seal arrangement, in accordance with various embodiments.

With reference to FIG. 7, a method 700 for assembling a seal arrangement is provided, in accordance with various embodiments. Method 700 includes placing a seal sub-assembly into a carrier (step 710). Method 700 includes placing a seal axially adjacent to the seal sub-assembly (step 720). Method 700 includes placing a seal plate axially adjacent to the seal (step 730). In various embodiments, method 700 may include placing the carrier into a static structure (step 740). In various embodiments, method 700 may include positioning the carrier such that the seal sub-assembly contacts a flange (step 750). In this regard, step 740 and step 750 may be optional.

With combined reference to FIG. 3 and FIG. 7, step 710 may include placing seal sub-assembly 500 into carrier 218. Step 720 may include placing seal 214 axially adjacent to seal sub-assembly 500. Step 730 may include placing seal plate 216 axially adjacent to seal 214. Step 740 may include placing carrier 218 into static structure 202. Seal sub-assembly 500, seal 214, and seal plate 216 may be located within carrier 218 when carrier 218 is placed into static structure 202. Step 750 may include positioning carrier 218 such that seal sub-assembly 500 contacts flange 222. More specifically, secondary seal cover 206 may contact flange 222.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal sub-assembly comprising:
    a spacer comprising:
        a first flange comprising a first proximal surface; and
        a second flange comprising a second proximal surface, the first proximal surface being disposed radially inward from the second proximal surface;
    at least one secondary seal located radially inward from and axially in line with the first proximal surface; and
    a secondary seal cover located radially inward from and axially in line with the second proximal surface,
    wherein at least a portion of the at least one secondary seal are located axially between the spacer and the secondary seal cover, and
    wherein the spacer is attached to the secondary seal cover via a metal joining process.

2. The seal sub-assembly of claim 1, wherein the spacer, the at least one secondary seal, and the secondary seal cover comprise an annular geometry.

3. The seal sub-assembly of claim 1, wherein the spacer is configured to be located axially adjacent to a non-contact seal.

4. The seal sub-assembly of claim 1, wherein the metal joining process comprises at least one of a weld, a solder, or a braze.

5. A method for manufacturing a seal sub-assembly comprising:
    placing at least one secondary seal axially adjacent to a spacer;
    placing a secondary seal cover axially adjacent to the at least one secondary seal and in contact with the spacer, wherein the at least one secondary seal is located axially between the spacer and the secondary seal cover; and
    attaching the secondary seal cover to the spacer,
    wherein the spacer comprises:
        a first flange comprising a first proximal surface; and
        a second flange comprising a second proximal surface, the first proximal surface being disposed radially inward from the second proximal flange
        the secondary seal located radially inward from and axially in line with the first proximal surface, and
        the secondary seal cover located radially inward from and axially in line with the second proximal surface.

6. The method of claim 5, wherein the placing the at least one secondary seal axially adjacent to the spacer provides a distal surface of the at least one secondary seal axially in line with a proximal surface of a first flange of the spacer.

7. The method of claim 5, wherein the attaching the secondary seal cover is performed via a metal joining process.

8. The method of claim 7, wherein the metal joining process comprises at least one of a weld, a solder, or a braze.

9. The method of claim 5, wherein the attaching is performed at a junction between a distal surface of the secondary seal cover and a proximal surface of the spacer.

10. The method of claim 5, wherein the placing the secondary seal cover axially adjacent to the at least one secondary seal includes placing the secondary seal cover radially inward from a second flange of the spacer.

11. A method for assembling a seal arrangement comprising:
   placing a seal sub-assembly into an annular carrier;
   placing a seal axially adjacent to the seal sub-assembly; and
   placing a seal plate axially adjacent to the seal, the seal located axially between the seal sub-assembly and the seal plate and the annular carrier circumferentially surrounding at least one of the seal sub-assembly, the seal, and the seal plate;
   wherein the seal sub-assembly comprises:
      a secondary seal cover;
      a spacer; and
      at least one secondary seal located between the secondary seal cover and the spacer, the secondary seal cover attached to the spacer via a metal joining process;
   wherein the spacer comprises:
      a first flange comprising a first proximal surface; and
      a second flange comprising a second proximal surface, the first proximal surface being disposed radially inward from the second proximal flange
      the secondary seal located radially inward from and axially in line with the first proximal surface, and
      the secondary seal cover located radially inward from and axially in line with the second proximal surface.

12. The method of claim 11, further comprising placing the annular carrier into an annular static structure, a distal surface of the annular carrier in contact with a proximal surface of the annular static structure.

13. The method of claim 12, further comprising positioning the annular carrier such that the seal sub-assembly contacts a flange extending radially inwards from the annular static structure.

14. The method of claim 13, wherein the metal joining process comprises at least one of a weld, a solder, or a braze, wherein the positioning the annular carrier such that the seal sub-assembly contacts the flange comprises placing the at least one of the weld, the solder, or the braze between the flange and the seal sub-assembly.

15. The method of claim 12, wherein the placing the annular carrier into the annular static structure comprises snapping the annular carrier into the annular static structure.

16. The method of claim 13, wherein a maximum diameter of the secondary seal cover is less than a minimum diameter of the annular carrier.

17. The method of claim 11, wherein the seal comprises a non-contact seal.

* * * * *